United States Patent [19]

Frohbach et al.

[11] Patent Number: 5,363,200

[45] Date of Patent: Nov. 8, 1994

[54] BUFFERING METHOD AND SYSTEM FOR RESONANT SCANNER USED TO READ AND WRITE DATA WITH RESPECT TO A STORAGE MEDIUM

[75] Inventors: Hugh F. Frohbach, Sunnyvale; Norman A. Peppers, Belmont, both of Calif.

[73] Assignee: Samsung Electronics Co., Ltd., Rep. of Korea

[21] Appl. No.: 944,951

[22] Filed: Sep. 15, 1992

[51] Int. Cl.⁵ .............................................. H04N 5/76
[52] U.S. Cl. ....................................... 358/335; 369/97
[58] Field of Search ............... 358/335, 310, 342, 332, 358/333, 344, 345, 346, 347, 348; 360/33.1, 114; 369/97, 124, 44.17, 44.11; H04N 5/78, 5/783, 5/85, 9/79, 5/82, 5/84

[56] References Cited

U.S. PATENT DOCUMENTS

| | | |
|---|---|---|
| 4,264,986 | 4/1981 | Willis . |
| 4,371,954 | 2/1983 | Cornet . |
| 4,398,203 | 8/1983 | Cornet . |
| 4,404,656 | 9/1983 | Cornet . |
| 4,538,159 | 8/1985 | Gupta et al. . |
| 4,647,947 | 3/1987 | Takeoka et al. . |
| 4,661,941 | 4/1987 | Bell et al. ............................... 369/97 |
| 4,674,076 | 6/1987 | Hsieh et al. ........................... 369/32 |
| 4,719,615 | 1/1988 | Feyrer et al. . |
| 4,868,686 | 9/1989 | Guisinger et al. .................. 360/33.1 |
| 4,912,696 | 3/1990 | Feyrer et al. . |
| 5,098,176 | 3/1992 | Wolf ...................................... 359/11 |
| 5,138,603 | 8/1992 | Narahara et al. ...................... 369/97 |
| 5,187,364 | 2/1993 | Blais ...................................... 250/236 |
| 5,235,180 | 8/1993 | Montagn .......................... 250/231.13 |

*Primary Examiner*—Tommy P. Chin
*Assistant Examiner*—Thai Tran
*Attorney, Agent, or Firm*—Burns, Doane, Swecker & Mathis

[57] ABSTRACT

A buffering system and method for data recorded by a laser on a moving optical medium, such as a flexible optical tape wherein data (e.g., analog video information) can be buffered to permit recording on a flexible optical medium in a manner which optimizes recording efficiency and space utilization on the recording medium.

15 Claims, 3 Drawing Sheets

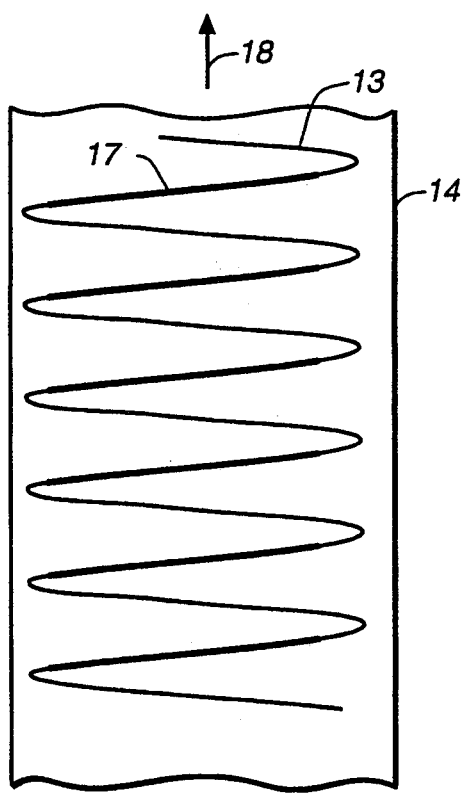 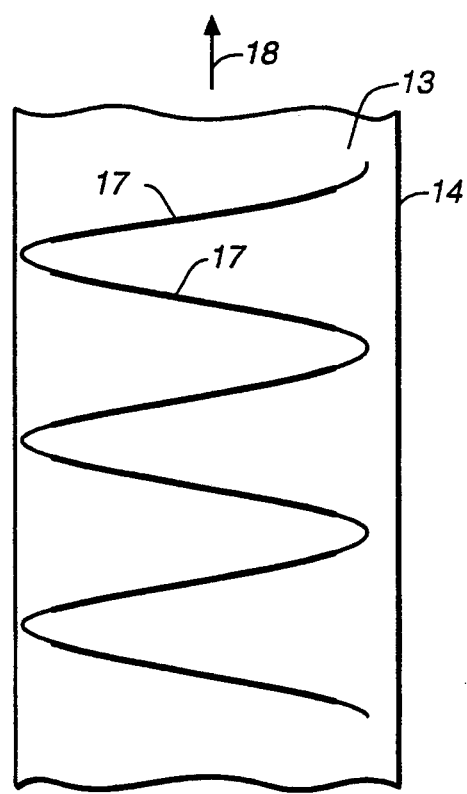
FIG._1A    FIG._1B

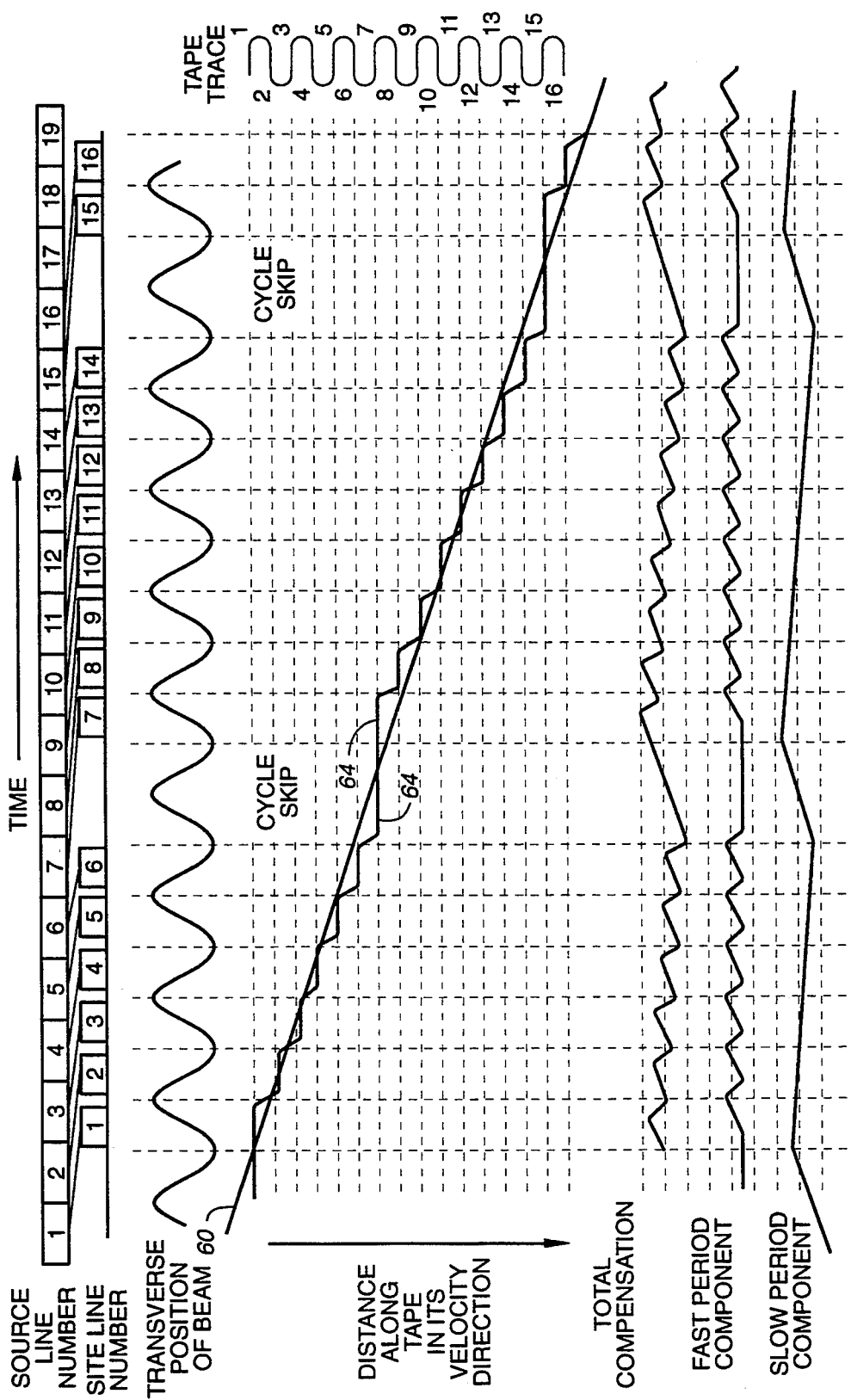
FIG._2

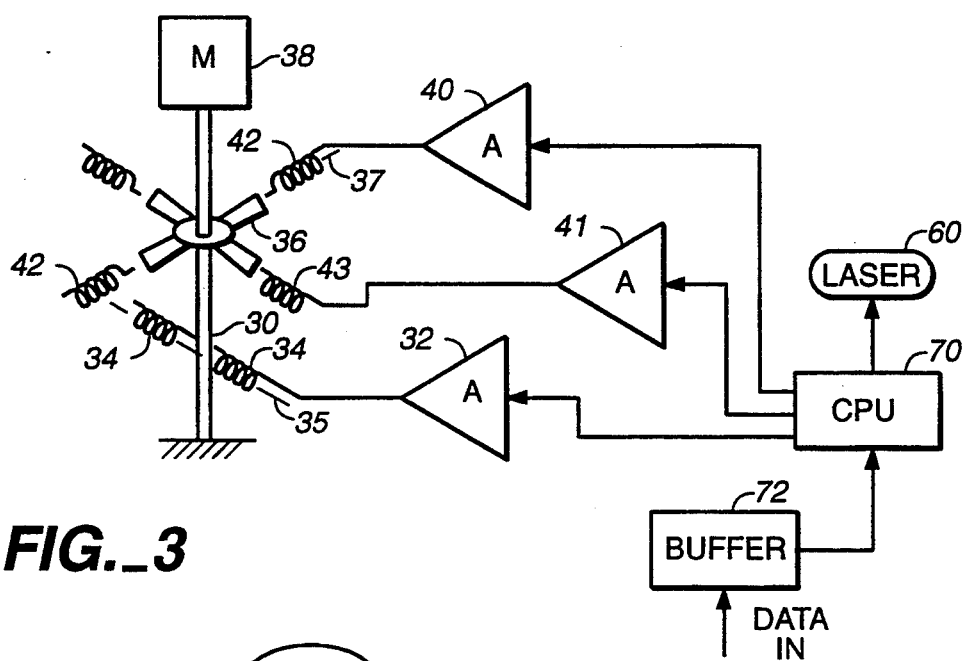
FIG._3
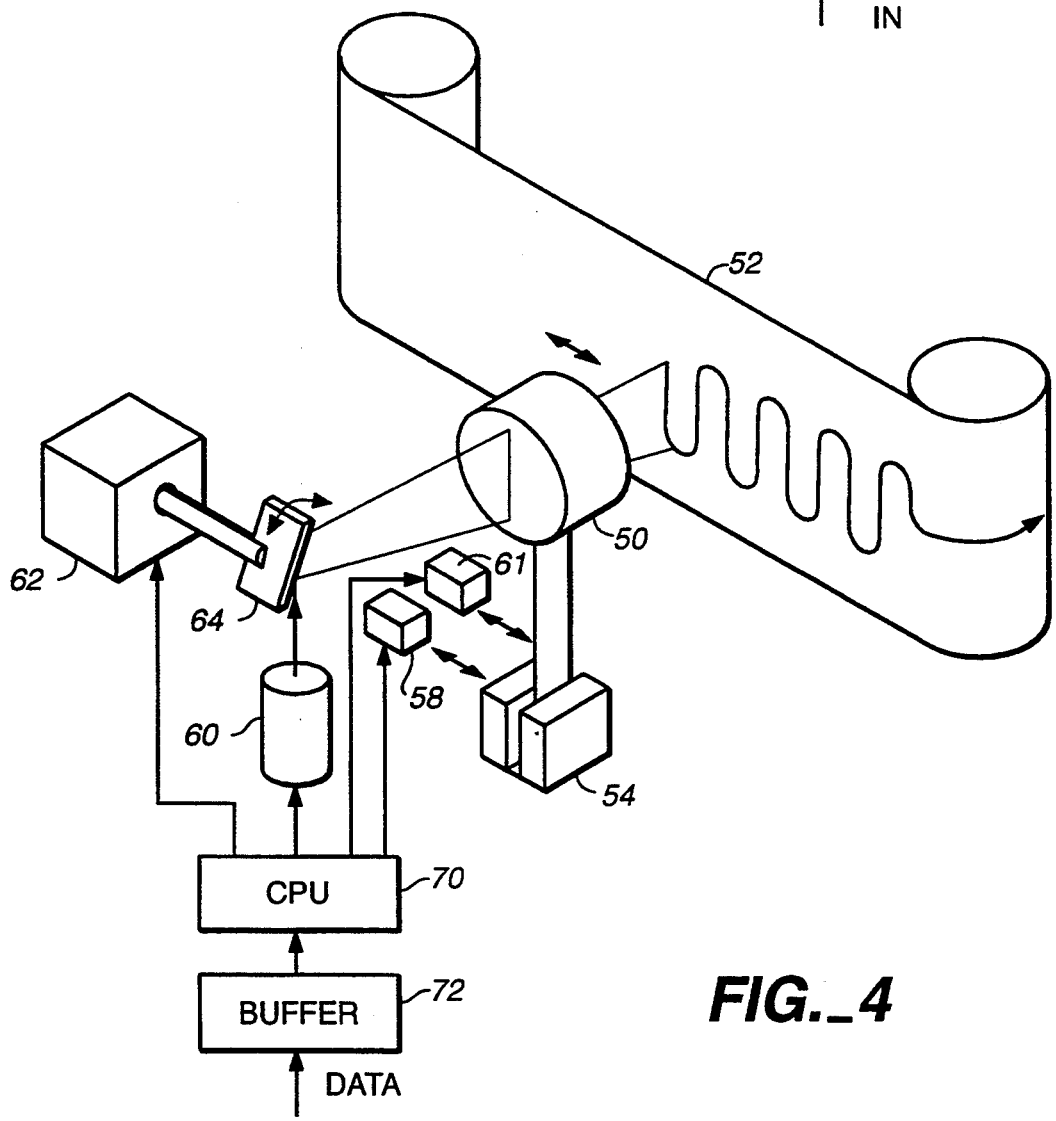
FIG._4

BUFFERING METHOD AND SYSTEM FOR RESONANT SCANNER USED TO READ AND WRITE DATA WITH RESPECT TO A STORAGE MEDIUM

BACKGROUND OF THE INVENTION

1. Field of the Invention

The present invention relates generally to data buffering for recording and playback systems. More particularly, the invention relates to buffering systems and methods for use during optical writing and reading of data with respect to a storage medium, such as a flexible optical tape in an optical video recorder (OCR).

2. State of the Art

Presently, flexible tape for optical storage of data is known, as described in U.S. Pat. Nos. 4,719,615 and 4,912,696, both identified on their cover pages as being assigned to Optical Data, Inc. To optically record data on a medium such as a flexible optical tape, a beam of laser light is directed onto the tape. The laser beam melts the tape or burns holes in the tape to produce data spots representing bits of data. The data spots have a reflectance, transmittance or other optical characteristic which can be distinguished from the background of the optical tape.

Presently, optically sensitive tape has not been effectively used to record high frequency signals such as television video signals. One reason for this is the absence of an effective laser scanning system wherein data (e.g., analog video data) arriving at a constant input rate can be recorded uniformly (without gaps) on a medium (e.g., optical tape) moving at a constant speed.

Other known recording systems, such as facsimile systems, do not adequately address the problem at hand. While these systems may receive input data at a constant rate and record data on a moving paper medium, the medium is not continuously moving at a constant speed. Rather, the medium is moved incrementally so that a marking (i.e., printing) mechanism can print information as it is received.

Input data is received by a facsimile system during times when the marking (i.e., printing) mechanism is not positioned to print. Thus, the data is buffered (i.e., stored in memory) until the marking mechanism reaches the proper write location. The marking mechanism is able to print at a rate equal to or faster than the input data rate.

Typically, facsimile systems use at least three line-storage buffers. As input scan lines are received, they are stored at the input rate in each of the three buffers sequentially. Concurrently, the content of a previously loaded buffer is transferred to the printing mechanism at the faster printing rate. Thus, there is one buffer which is currently being filled from the input, a second buffer which is being emptied by the printer and a third buffer which is empty awaiting filling from the input.

Because emptying of the aforementioned second buffer is performed at a rate faster than the input (i.e., filling) data rate, there are times when the printing mechanism is ready for a new line but an output buffer has not been filled with new data. At these times, there are two empty buffers with the third still being filled from the input. When this occurs, the paper advancing mechanism is typically stopped to permit the line buffer system to catch up until a full buffer is available for printing.

Thus, although buffering techniques are generally well known for addressing timing problems in data recording systems, they have typically been designed for specific systems. Accordingly, the facsimile buffering system described above would not practically be applicable for use in an optical recording and playback system having a continuously moving recording medium. Unlike a facsimile system where the paper advancing mechanism can be stopped to permit the printing and buffering system to catch up, a uniformly moving optical tape can not be similarly operated.

SUMMARY OF THE INVENTION

The present invention therefore relates to a buffering system and method for data recorded by a laser on a moving optical medium, such as a flexible optical tape. In accordance with the present invention, data (e.g., analog video information) can be buffered to permit recording on a flexible optical medium in a manner which optimizes recording efficiency and space utilization on the recording medium.

In a preferred embodiment, the invention relates to a method for storing information on a continuously moving medium, such as an optical recording medium, comprising the steps of receiving data at a first rate, and storing said data in a first memory; retrieving said data from said memory at a second rate; and uniformly recording said retrieved data on said moving medium by scanning said continuously moving medium at a third rate. An exemplary embodiment further includes steps of moving the optical recording medium in a first direction, scanning a beam of light over said moving optical recording medium in a second direction substantially perpendicular to said first direction to record output data read from memory onto said moving optical recording medium, and periodically deflecting said scanning beam in said first direction to compensate for differences between said data input rate and said data output rate during said step of scanning.

BRIEF DESCRIPTION OF THE DRAWINGS

Other aspects of the present invention will become more apparent from the following detailed description of the preferred embodiments as described in conjunction with the accompanying drawings, wherein like elements have been designated by like reference numbers, and wherein:

FIGS. 1a and 1b show sinusoidal traces over an optical recording medium (e.g., optically sensitive OCR tape) during recording and reading of video information on the recording medium;

FIG. 2 shows waveforms used to control data buffering while scanning an optical beam over the recording medium during reading or recording in accordance with the present invention; and FIGS. 3 and 4 show exemplary embodiments of systems which provide for data buffering while writing and reading data using a galvanometer scanning system controlled in accordance with the present invention.

DETAILED DESCRIPTION OF THE PREFERRED EMBODIMENTS

To illustrate advantages of a buffering technique in accordance with the present invention, reference will be made to the optical recording of video data. FIG. 1a shows an example of a generally sinusoidal trace 13 formed by a laser beam on an optical recording medium such as optical tape 14. The laser beam is deflected back and forth across the tape at a fixed scan rate. This fixed scan rate can be produced by deflecting the laser beam with a torsional, resonant-mirror galvanometer across the optical recording tape 14 as the tape moves slowly in the direction of arrow 18.

By modulating the laser beam, video signal information can be optically recorded in one direction across the tape (e.g., FIG. 1a) or information can be recorded in both directions across the tape (e.g., FIG. 1l). In this latter case, recording can be done from left to right, and then from right to left across the tape. A modified frequency modulation (MFM) technique can be used to write the data on the optical tape, with a set of varying data spot sizes being used to represent input data.

In FIGS. 1a and 1b, video recording takes place in "active" portions 17 (see FIG. 1b) of each trace over the recording medium. Active portions 17 are defined as those relatively linear portions of the trace during which the tracing velocity is more than one-half of its value at the center of the trace. Relatively non-linear portions of the trace correspond to remaining portions of the trace where the scanning velocity slows to reverse scanning direction.

In practice, the active portion of each trace occupies about 87 percent of the peak-to-peak amplitude of the trace and represents a duty cycle of approximately 67 percent. Television video information, encoded in digital or analog form, can be recorded in the active portions 17.

Where the data recorded is video information, each active portion 17 comprises an integral number of the horizontal scan lines of a television field. For example, the first horizontal active portion 17 includes four horizontal scan lines from an even field of a television video frame; the second horizontal active portion includes the four subsequent horizontal scan lines from the same field, and so on. The remaining portions of the traces can be used for recording lower frequency (i.e., low bandwidth) information as described in commonly assigned, co-pending application Ser. No. 07/944,977, Attorney Docket No. 023833-003, entitled "Data Formats On Optical Video Tape" the disclosure of which is hereby incorporated by reference in its entirety.

Still further with regard to FIGS. 1a and 1b, it should be noted that the active portions 17 are nearly perpendicular to the longitudinal edges of tape 14. As the orientation of the traces becomes more perpendicular, improved implementation of special effects such as still, slow scan and fast scan of recorded video information can be realized, as described in commonly assigned, co-pending U.S. application Ser. No. 07/817,622, Attorney Docket No. 023833-008, entitled "Video Tape Format For Providing Special Effects Capabilities", filed Jan. 7, 1992 the disclosure of which is hereby incorporated by reference in its entirety.

Continuous input video signals represented by, for example, values of luminance (Y) and chrominance (C), as well as continuous audio signals can be converted into time-compressed bursts for writing on the optical tape. These bursts are timed to occur when the galvanometer is scanning the appropriate portions of the tape as defined by the aforementioned tape data format.

In accordance with the present invention, a conversion from continuous to intermittent data representations is accomplished using a memory which represents an electronic buffer. The buffer stores information, such as the audio-video information described above. Using a buffering method in accordance with the present invention, data can be written and read uniformly, without gaps, even though the resonant galvanometer has an independent and slightly higher constant frequency relative to the data input rate. A technique for accomplishing this buffering when using a fixed frequency, torsional resonant-mirror galvanometer to record data will now be explained in greater detail.

The use of a self-resonant galvanometer as a primary laser beam deflector provides significant advantages. For example, because this device is relatively simple in design (i.e., it does not require bearings or sliding parts), it possesses an almost infinite life. However, because it is self—resonant, its frequency is not easily synchronized with periodic blocks of continuously received, incoming data (e.g., horizontal scan lines of a television picture signal) which are to be recorded on a continuously moving medium.

To permit synchronization between the incoming data, the self-resonant galvanometer and the moving recording medium, data associated with the horizontal scan lines is buffered in memory and supplied to the galvanometer on demand. Further, the galvanometer is controlled in a manner which permits the data to be uniformly recorded on the moving medium without gaps. This buffering method and galvanometer control ensures optimized space utilization on the recording medium.

As described in the co-pending U.S. application Ser. No. 07/944,978, Attorney Docket No. 023833-010, entitled "Bidirectional Sinusoidal Scanning System", a sinusoidal scanner can be deflected back and forth across a moving optical medium by applying a primary scanning sinusoid to the self-resonant torsional galvanometer. To render the sloping active regions 17 of the sinusoidal trace in FIG. 1b nearly perpendicular to edges of the optical medium, a compensatory motion can be used to deflect the reciprocating, self-resonant mirror of the galvanometer in the direction of tape movement. Thus, active traces 17 can be uniformly spaced from one another on the medium.

The wave shape of the added compensatory component ideally includes a linear regressive portion which exactly compensates for the forward motion of the medium during each active line time. A suitable correction waveform is shown in FIG. 2 as the fast period component. This component corresponds to the vertical position correction waveform shown in FIG. 3a of the aforementioned co-pending U.S. application Ser. No. 07/944,978, Attorney Docket No. 023833-010.

As mentioned above, the fast period component shown in FIG. 2 compensates the sinusoidal traces of the optically scanned beam to provide nearly horizontal, linear "active" portions which are approximately perpendicular to the direction of tape movement. However, it will be appreciated that nearly perfect correction may not always be required. For example, acceptable results for most applications can be obtained by applying a simple sinusoidal harmonic motion of twice the frequency of the primary scanning sinusoid in the direction of tape movement. The peak amplitude of the added compensation can be 12% of the total distance traversed in the direction of tape movement in one cycle of the primary sinusoid.

In an exemplary embodiment of the present invention, the input blocks of data to be recorded in the active regions 17 are first stored in a memory buffer. A galvanometer is selected which has a resonant period slightly shorter than that of the input data block period.

Hence the galvanometer can record the information without data loss since it can empty the memory buffer faster than the buffer is filled by incoming data.

Because the buffer can be emptied faster than it can be filled, there are cyclic pauses during which the scanning device is ready for additional information but the buffer has not yet been filled. In these instances, the recording process is periodically halted for a complete galvanometer cycle while the input buffer is filled. This pause is referred to herein as a "cycle skip".

To provide the "cycle skip", another compensatory motion of the laser beam is provided in the direction of tape movement. This second compensatory motion represents a slow period component of the total correction signal applied to the resonant-mirror galvanometer. A suitable waveform for the slow period component is also illustrated in FIG. 2. As further shown in FIG. 2, the total correction signal can include both a fast period component and a slow period component. A system which controls a resonant-mirror galvanometer in response to these compensatory signals during the recording of buffered data will now be described.

Generally speaking, data can be written to or read from optical tape using a system which includes a means for illuminating an optical tape, such as a solid state semiconductor laser 100. Means for transmitting light (i.e., visible as well as invisible (e.g., infrared) light) from the laser to the optical tape can include a collimating lens, a light expanding means, a polarizing beam splitter, a quarter wave plate, a scanning galvanometer mirror (and scanning mirror drive) and a focusing lens.

As shown in FIG. 3, a primary oscillatory sinusoidal deflection is input via a torsional drive amplifier 32 and coil 34 for interaction with a magnetically permeable ring 36 attached to a torsional rod 30. A sinusoidal waveform input via the coil 34 causes the self-resonant torsional rod 30 and a mirror 38 attached to the rod to deflect back and forth along an axis 35. This produces a sinusoidal scan trace back and forth across the optical recording medium (e.g., traces shown in FIGS. 1a and 1b).

Introduction of the fast period component of a total correction signal for controlling the resonant galvanometer, is described in the aforementioned co-pending application. For example, the correction may be introduced at the scanning device as a small deflection perpendicular to the primary sinusoidal motion. Alternately, the correction can be introduced in the optical path between the scanning device and the medium using, for example, a small deflecting mirror or a small translation of a lens. Further, the correction can be introduced at the medium itself by stepping it in synchronism with the scanner so that it is moved only between active line intervals.

FIG. 3 shows introduction of a fast period correction at the scanning device. A small deflection perpendicular to the primary sinusoidal motion of a resonant galvanometer is applied to the self-resonant torsional rod 30. This correction motion is induced magnetically by applying a waveform (i.e., "fast period component" of FIG. 2) which corresponds to an acceleration profile of the vertical position signal.

The fast period correction signal drives the torsional rod 30 via a second drive 40 and coil 42. The coil 42 is oriented so that a nodding motion of the mirror 38 will cause a laser beam deflected off the mirror to track the motion of a moving medium during an active portion.

To provide the aforementioned "cycle skip" due to data buffering, the "slow period component" of FIG. 2 is added to the total correction waveform to further deflect the laser beam in the direction of medium movement. For this purpose, an additional beam deflector such as amplifier 41 and coil 43 of FIG. 3 is provided to deflect the beam in the direction of motion of the optical medium. Each of the primary sinusoid, the fast period component and the slow period component are provided to the amplifiers 32, 40 and 41, respectively from a computer (CPU) 70. The CPU 70 also receives input data via a buffer 72 and writes data on a recording medium via laser 60 (whose output beam is deflected by mirror 38).

FIG. 4 shows an alternate configuration for implementing correction of the sinusoidal trace to create nearly linear, parallel traces perpendicular to the direction of tape movement and to account for the "cycle skip" of the buffer. In FIG. 4, a primary sinusoidal scanner 62 and mirror 64 are used to reflect a laser beam from a laser 60 onto a recording medium 52. A final focusing lens 50 is physically translated periodically in a direction parallel to the motion of the medium 52. The lens is attached to a flexible support 54 which is oscillated at a resonant frequency by a piezoelectric actuator 58.

The actuator 58 is driven by the aforementioned fast period compensatory component in the direction of tape movement. The peak motion required for the flexible support 54 is relatively small, with the peak excursion being about ¼ of the distance between adjacent scan lines on the optical recording medium. It will be appreciated by those skilled in the art that the piezoelectric actuator can be replaced by any suitable actuator including a drive solenoid or any other device capable of moving the lens through the desired profile.

An actuator 61 is also used to introduce the cycle skip motion. The actuator 61 is driven by the slow period component and acts upon the flexible support 54 to provide uniform recording on the medium, without gaps, when buffering input data. A CPU 70 receives input data via a buffer 72 and provides control signals to each of actuators 58, 61, 62 and laser 60.

Rather than the two separate actuators used in FIG. 3 and 4, a single actuator can also be used to supply the total compensation signal of FIG. 2. However, in some applications it may be more convenient to use two actuators in cascade, each supplying a different component (i.e., fast component and slow component) as described above. Further, the optical data recording system includes a laser, an expansion lens, a path folding mirror, a resonant mirror galvanometer, and a converging lens, and one skilled in the art will appreciate that the deflection compensation described in accordance with the present invention can be introduced into the optical path by moving any of these optical elements or any combination of them.

Operation of the FIG. 3 and 4 embodiments to effect uniform recording of buffered input data on an optical tape will now be described with respect to the FIG. 2 waveforms. The beam deflector used to provide a cycle skip in the FIG. 3 and 4 embodiments effects the optical equivalent of an intermittent (i.e., start-stop) motion. Because the tape movement is uniform and continuous, this additional beam deflector accounts for the discrepancy between the uniform tape motion and the cycle skip pauses in the data flow. Thus, traces can be formed on the tape continuously without gaps.

For example, a laser beam position coordinate as measured along the length of a tape is plotted as a function of time in FIG. 2. A buffer timing sequence represents that continuous, consecutively numbered blocks of input data are filling consecutive "source line" buffers at a uniform rate. A series of numbered blocks indicate the times at which corresponding "write line" buffers are written onto the tape.

More particularly, information to be recorded is received by a buffer represented as the "source line" of FIG. 2. This information is associated with a source line number. The "write line" number represents the buffer which is currently being written to the optical tape. As seen in FIG. 2, the "write line" number is delayed relative to the "source line" number.

The sinusoidal transverse position of the deflected beam is included as a time reference below the series of numbered buffer blocks. Further, a sinuous path of consecutively numbered horizontal lines on the right hand side of the FIG. 2 diagram represents the positions on the tape at which correspondingly numbered "source line" data blocks are recorded. As can be seen, no gaps exist in this column even though the data has been written intermittently. This is because a stair-step characteristic of position versus time profile for the laser position relative to the tape has been provided.

To generate the aforementioned stair-step motion illustrated in FIG. 2, the aforementioned total correction signal is supplied to the scan compensation actuators in FIGS. 3 and 4. The total correction waveform includes (1) the fast period motion for linearizing the bidirectional traces; and, (2) a slower triangular motion representing the slow period component needed to prevent gaps during the cycle skip intervals. This correction signal corresponds to a difference between the stair-step profile and the constant speed of the tape.

Using the compensation waveform shown at the bottom of FIG. 2, nearly parallel, linear traces as shown in right hand side of FIG. 2 can be produced over the tape. Because the system writes data to the tape more quickly than data is stored in the source line number buffer, periods occur when data is not available for writing on the tape. As shown in FIG. 2, this time occurs after six buffers of data have been written (i.e., between points 62 and 64 in FIG. 2). Between writing of the sixth and seventh buffer, the slow period component causes a deflection of the galvanometer in the direction of tape movement during the period at which no writing occurs. This is represented in FIG. 2 as the cycle skip area. When the seventh buffer of data is ready for writing, writing occurs along the number 7 tape trace shown in the right hand side of FIG. 2. Because the laser beam has been deflected at the time of writing the seventh buffer, no gap exists on the tape between the sixth and seventh buffers of recorded data.

As mentioned above, a nearly linear trace can be maintained despite the fact that the galvanometer has been deflected in the direction of tape movement. The straight line 60 in FIG. 2 illustrates the linear relationship which exists between the writing of data and tape movement. As mentioned above, although a cycle skip occurred from points 62 to 64 during writing, the average writing of data versus tape speed results in a nearly linear relationship.

In an exemplary embodiment, each of the component deflections of the total correction waveform is relatively small, with neither of the signal amplitudes exceeding the spatial distance associated with one period (e.g., a few microns) of the trace of the galvanometer in the direction of tape movement. That is, the corrective motion used to linearize active trace marks on a moving optical tape and the corrective motion used to effect a cycle skip have amplitudes which are less than the distance the tape travels during one complete galvanometer cycle.

The sum of the aforementioned corrective signals is therefore also small. For example, a typical optical tape recording system can include a bidirectional galvanometer with a spatial period of 3.2 micrometers on the tape. In this case, a deflection actuator capable of providing plus or minus 2 micrometers of spot movement along the velocity direction of the tape would be adequate. Such movement is well within the range of known piezoelectric actuators.

Although the exemplary embodiment described above has been discussed in the context of an optical system which uses flexible optical tape, it will be appreciated that the invention can be applied to any scanning system which optically records or reads data. Further, although an exemplary embodiment has been described in the context of a television video signal, it will be appreciated that any signals can be recorded using the above-identified technique.

More particularly, reference has been made to the use of a data buffering method in the context of an audio-video recording and playback system. However, those skilled in the art will recognize that the buffering method described allows data arriving at a first constant input rate to be uniformly recorded on a medium moving at a constant speed by a recording device which scans the medium at yet another, independent fixed rate. Accordingly, the invention is not limited to the optical recording of audio-video data, but rather, encompasses the recording of any data onto a continuously moving recording medium by a scanning device.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for storing information on an optical recording medium comprising the steps of:
   receiving information to be recorded on the optical recording medium;
   storing said information in a buffer memory at a data input rate;
   reading data from said buffer memory at a data output rate, said data output rate being greater than said data input rate;
   moving said optical recording medium in a first direction;
   scanning a beam of light over said moving optical recording medium in a second direction substantially perpendicular to said first direction for recording output data read from said buffer memory; and
   periodically deflecting said scanning beam in said first direction, by a distance over which said optical recording medium moves during a cyclic pause in said recording of output data read from said buffer memory, to compensate for differences between said data input rate and said data output rate.

2. Method according to claim 1, wherein said step of scanning further includes the step of:
scanning at a speed relative to the recording medium speed which permits video signal information associated with video signal fields to be stored during consecutive scan cycles.

3. Method according to claim 2 wherein said step of deflecting further includes a step of:
discontinuing recording on said medium during at least one scan cycle.

4. Method according to claim 3 wherein said optical recording medium is a flexible optical tape.

5. Apparatus for storing information on an optical recording medium comprising:
means for receiving information to be recorded on the optical recording medium;
means for storing said information in a buffer memory at a data input rate;
means for reading data from said buffer memory at a data output rate, said data output rate being greater than said data input rate;
means for moving said optical recording medium in a first direction;
means for scanning a beam of light over said moving optical recording medium in a second direction substantially perpendicular to said first direction for recording output data read from said buffer memory onto said recording medium; and
means for periodically deflecting said scanning beam in said first direction of medium movement, during a cyclic pause in said recording of output data read from said buffer memory, to compensate for differences between said data input rate and said data output rate.

6. Apparatus according to claim 5, wherein said optical recording medium is a flexible optical tape.

7. Apparatus according to claim 5, wherein said means for scanning further includes:
a resonant mirror galvanometer for deflecting a light beam across the optical recording medium;
an amplifier for providing a primary sinusoidal motion to deflect the resonant mirror galvanometer; and
a second amplifier for providing a first periodic correction motion to deflect the resonant mirror galvanometer during each pass of the light beam across the optical recording medium.

8. Apparatus according to claim 7, wherein said periodic deflecting means further includes:
a third amplifier for providing a second periodic correction motion to deflect the resonant mirror galvanometer in the direction of movement of the optical recording medium.

9. Apparatus according to claim 8, wherein neither of said first and second periodic correction motions provided by the second and third amplifiers exceed the spatial distance associated with one period of the trace in the direction of movement of the optical recording medium.

10. Method for storing information on a continuously moving medium comprising the steps of:
receiving data at a first rate, and storing said data in a first memory;
retrieving said data from said first memory at a second rate; and
uniformly recording said retrieved data on said moving medium by scanning said continuously moving medium with a scanning beam at a third rate, said step of uniformly recording further including a step of periodically deflecting said scanning beam in a first direction of continuous movement of said moving medium, by a distance over which said optical recording medium moves during a cyclic pause in said recording of said retrieved data, to compensate for differences between said first rate and said second rate.

11. Method according to claim 10, wherein said step of uniformly recording further includes the steps of:
scanning said moving medium along a path having a second direction substantially perpendicular to said first direction to record output data read from said memory.

12. Method according to claim 11, wherein said step of scanning further includes the step of:
scanning a beam of light over said moving medium.

13. Method according to claim 12, wherein said step of scanning further includes the step of:
scanning at a speed relative to the recording medium speed which permits video signal information associated with video signal fields to be stored during consecutive scan cycles.

14. Method according to claim 13, wherein said step of periodically deflecting further includes a step of:
discontinuing recording on said moving medium during at least one scan cycle.

15. Method according to claim 14, wherein said moving medium is a flexible optical tape.

* * * * *